(12) United States Patent
Ejiri et al.

(10) Patent No.: US 7,271,803 B2
(45) Date of Patent: Sep. 18, 2007

(54) METHOD AND SYSTEM FOR SIMULATING STEREOGRAPHIC VISION

(75) Inventors: Koichi Ejiri, Chiba (JP); Ying-Jieh Huang, Kanagawa (JP); Shin Aoki, Kanagawa (JP); Haike Guan, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 278 days.

(21) Appl. No.: 10/455,144

(22) Filed: Jun. 5, 2003

(65) Prior Publication Data

US 2004/0032407 A1   Feb. 19, 2004

Related U.S. Application Data

(63) Continuation-in-part of application No. 09/227,707, filed on Jan. 8, 1999, now abandoned.

(51) Int. Cl.
*G06T 15/10* (2006.01)
*H04N 13/04* (2006.01)

(52) U.S. Cl. .......................... 345/427; 348/51; 348/46

(58) Field of Classification Search ............... 345/427; 348/36
See application file for complete search history.

(56) References Cited

U.S. PATENT DOCUMENTS 4,763,280 A * 8/1988 Robinson et al. ............. 348/36
5,396,583 A * 3/1995 Chen et al. .................. 345/427
5,495,576 A * 2/1996 Ritchey ....................... 345/420
5,561,756 A * 10/1996 Miller et al. ................. 715/848
5,703,604 A * 12/1997 McCutchen ................... 345/8
5,721,585 A * 2/1998 Keast et al. .................. 348/36
5,850,352 A * 12/1998 Moezzi et al. .............. 345/419
6,108,005 A * 8/2000 Starks et al. ................ 345/419
6,243,099 B1 * 6/2001 Oxaal ......................... 345/419
6,271,853 B1 * 8/2001 Oxaal ......................... 715/848

FOREIGN PATENT DOCUMENTS

JP        03-048233 A      3/1991
JP        HEI 7-182533     7/1995

OTHER PUBLICATIONS

Fisher, Viewpoint Dependent Imaging: An Interactive Stereoscopic Display, 1982, SPIE pp. 1-5.*

* cited by examiner

*Primary Examiner*—Kee M. Tung
*Assistant Examiner*—Jason M. Repko
(74) *Attorney, Agent, or Firm*—Knoble Yoshida Dunleavy, LLC

(57) ABSTRACT

A 3-D visual simulating system stores image data sets in a predetermined viewing space for right and left visual field and selects a portion of the stored image data corresponding to the current visual field for displaying it to an observer. The 3-D image stimulus changes according to the current visual field of the observer and the location of the observer in a predetermined visual space in a manner that undesirable perceptional effects are substantially eliminated. The image data sets are stored in a reduced space in an efficient manner for retrieval.

27 Claims, 15 Drawing Sheets

FIG. 14

|  | ANGULAR EXPRESSION | COORDINATE EXPRESSION |
|---|---|---|
| S1 |  | CONVERTING REAL NUMBER |
| S2 |  | EXTRACTING COMMON PATTERN |
| S3 | CONVERTING TO ANGLE θ |  |
| S4 | SPECULATING A AND B |  |
| S5 | DETERMINING REAL θ AFTER CORRECTION |  |
| S6 | CONVERTING ANGULAR COODINATES |  |
| S7 | DETERMINING COODINATE CONVERSION MATRIX |  |
| S8 | ANGULAR CONVERSION |  |
| S9 |  |  |
| S10 |  |  |

METHOD AND SYSTEM FOR SIMULATING STEREOGRAPHIC VISION

This is a continuation-in-part of U.S. patent application Ser. No. 09/227,707, filed on Jan. 8, 1999, now abandoned.

FIELD OF THE INVENTION

The current invention is generally related to an image generation process and system, and more particularly related to a method and a system for generating visual data for stereographic vision and for presenting a portion of the visual data to an observer according to his or her visual field.

BACKGROUND OF THE INVENTION

To have an observer experience three-dimensional (3D) vision, a number of prior art technologies has attempted to simulate a stereo vision based upon a pair of two-dimensional (2D) images from a right visual field and a left visual field. These two images are slightly different from each other since they are taken at two closely located points which are substantially identical to a distance between human eyes. Based upon the above pair of images such as disclosed in Japanese Patent Publication Hei 7-182533, one can experience stereographic vision in a limited visual space in a predetermined direction. In other words, as an observer changes his or her visual field, additional pairs of images must be provided. For example, in order to accommodate 360 degrees of visual space, approximately fifteen pairs or thirty images are necessary. Although a plurality of pairs of the above described images can simulate 3-D vision in wide visual space, one may not necessarily experience natural or smooth 3-D vision as his or her visual field changes from one direction to another. In other words, an observer of the plural images may experience an undesirable jump in the 3-D vision as his or her visual field changes.

In other prior art attempts, wide-angle images from the right and left visual fields have been provided to reduce the above described undesirable jumping effects. For example, superimposed wide-angle images are projected onto a wide screen to simulate 3-D vision for audience with 3-D glasses. Although an observer of such wide-angle images may experience the 3-D vision without the jumping effect, the 3-D experience is still limited within a predetermined wide angle which is generally less than 180 degrees. At the same time, since an observer sees a portion of the wide-angle vision, the images outside a visual field of the observer are unused at any given time. Without the 3-D glasses, a viewing angle is generally limited (A Handbook for TV, Image-Information Engineering, Nov. 30, 1990).

There remain certain improvements in the area of simulating stereographic vision from 2-D images, and the improvements include efficient storage of image data, efficient use of the image data and smooth transitions in a display process. The current invention addresses these improvements.

SUMMARY OF THE INVENTION

In order to solve the above and other problems, according to a first aspect of the current invention, a method of displaying panoramic image data, corresponding first and second portions of the panoramic image data being selected for a right visual field and a left visual field based upon a visual direction of an observer, the selected first and second portions of the panoramic image data being displayed to the right visual field and the left visual field of the observer, the corresponding first and second portions of the panoramic image data being updated based upon a change in the visual direction of the observer, including the steps of: a) forming a 3D image based upon the panoramic image data captured from at least three predetermined sets of image-capturing locations; b) using the same first corresponding portion of the previously displayed panoramic image data without a change for one of the two visual fields in response to the visual directional change; and c) changing the second corresponding portion of the panoramic image data for the other of the two visual fields in response to the visual directional change.

According to a second aspect of the current invention, a method of displaying panoramic image, corresponding the first and second portions of the panoramic image data being selected for a right visual field and a left visual field based upon a visual direction of an observer, the selected first and second portions of the panoramic image data being displayed to a right eye and a left eye of the observer, the corresponding first and second portions of the panoramic image data being updated based upon a change in the visual direction of the observer, including the steps of: a) forming a 3D image based upon the panoramic image data captured from at least three predetermined sets of image-capturing locations; b) using the same first corresponding portion of the previously displayed panoramic image data without a change for one of the two visual fields in response to the visual directional changes; and c) changing the second corresponding portion of the panoramic image data for the other of the two visual fields in response to the visual directional change, wherein the second updated portion of the panoramic image data being overlapped with the second selected portion of the panoramic image data, the overlapped panoramic image data being displayed to the other of the two visual fields while gradually changed to the second updated portion of the panoramic image data.

According to a third aspect of the current invention, a panoramic image data displaying apparatus, including: a memory unit for storing panoramic image data collected captured from at least three predetermined sets of image-capturing locations; a visual direction input unit for inputting a visual direction of an observer; an image processing unit connected to the memory unit and the visual direction input unit for selecting the panoramic image data for a right eye and a left eye of the observer based upon the visual direction and generating corresponding first and second portions of the panoramic image data for a right visual field and a left visual field; and a display unit connected to the image processing unit for displaying the selected first and second portions of the panoramic image data to the right eye and the left eye of the observer, wherein the image processing unit updating the corresponding first and second portions of the panoramic image data in response to a change in the visual direction of the observer, the same first corresponding portion of the previously displayed panoramic image data being used without a change for one of the two visual fields in response to the visual directional change while the second corresponding portion of the panoramic image data being changed for the other of the two visual fields in response to the visual directional change.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

FIG. 14 is a table illustrating steps involved in the angular and coordinate conversions.

DETAILED DESCRIPTION OF THE PREFERRED EMBODIMENT(S)

Figure 1:
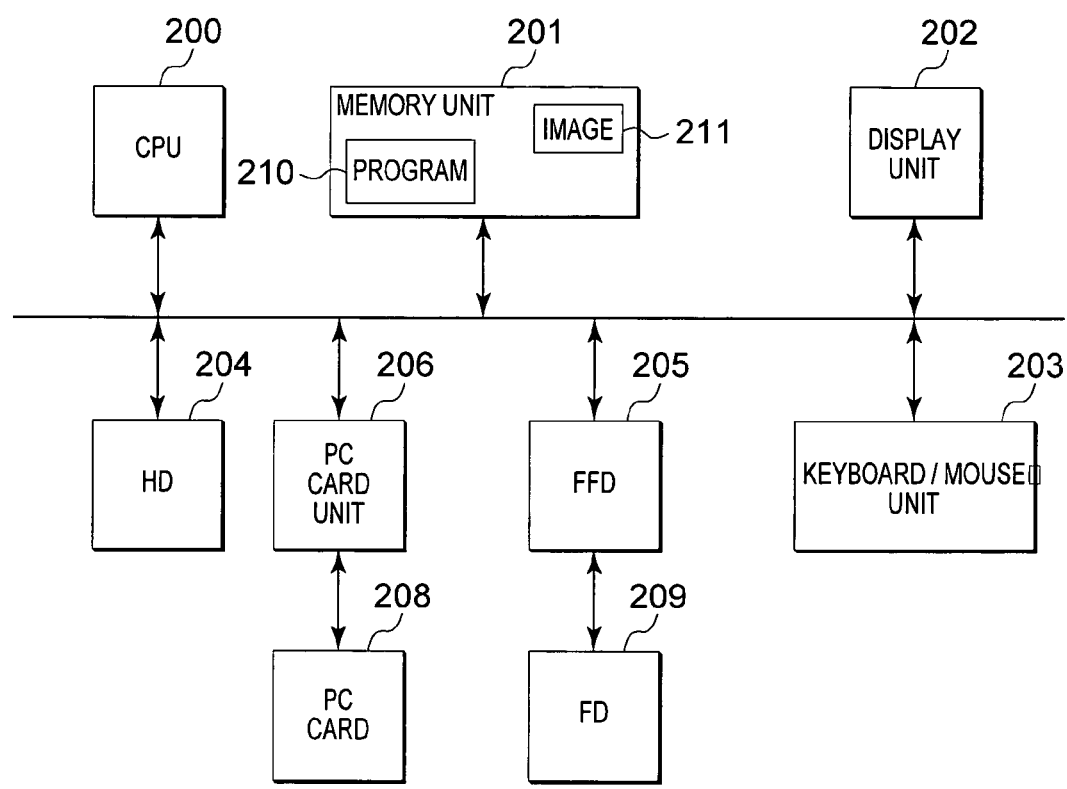
FIG. 1 illustrates one preferred embodiment of the system for simulating stereographic vision according tot the current invention.

Referring now to the drawings, wherein like reference numerals designate corresponding structure throughout the views, and referring in particular to FIG. 1, one preferred embodiment of the system for simulating stereographic vision according to the current invention includes a central processing unit (CPU) 200, a memory unit 201, an output device such as a display unit 202, an input device such as a keyboard/mouse unit 203, as well as secondary memory storage devices such as a hard disk 204, a floppy disk 209, a floppy disk drive 205, a PC card 208 and a PC card unit 206. An application program 210 processes image data 211 in the memory unit 201 to output visual stimuli for simulating stereographic vision through the display unit 202 such as a head-mounted stereo display. The image data is read into the memory unit 201 from any one or combination of the secondary storage devices. Based upon an input signal from the input unit 203, the application program 210 converts a selected portion of the image data into an output display signal indicative of a pair of right and left visual fields for projecting an image onto a flat surface. The converted and projected image data is stored back in the secondary storage device such as the hard disk 204 and the floppy disk 209. Later, the stored image data is retrieved from the secondary storage device to a predetermined image data location 211 in the memory unit 201.

Figure 2:
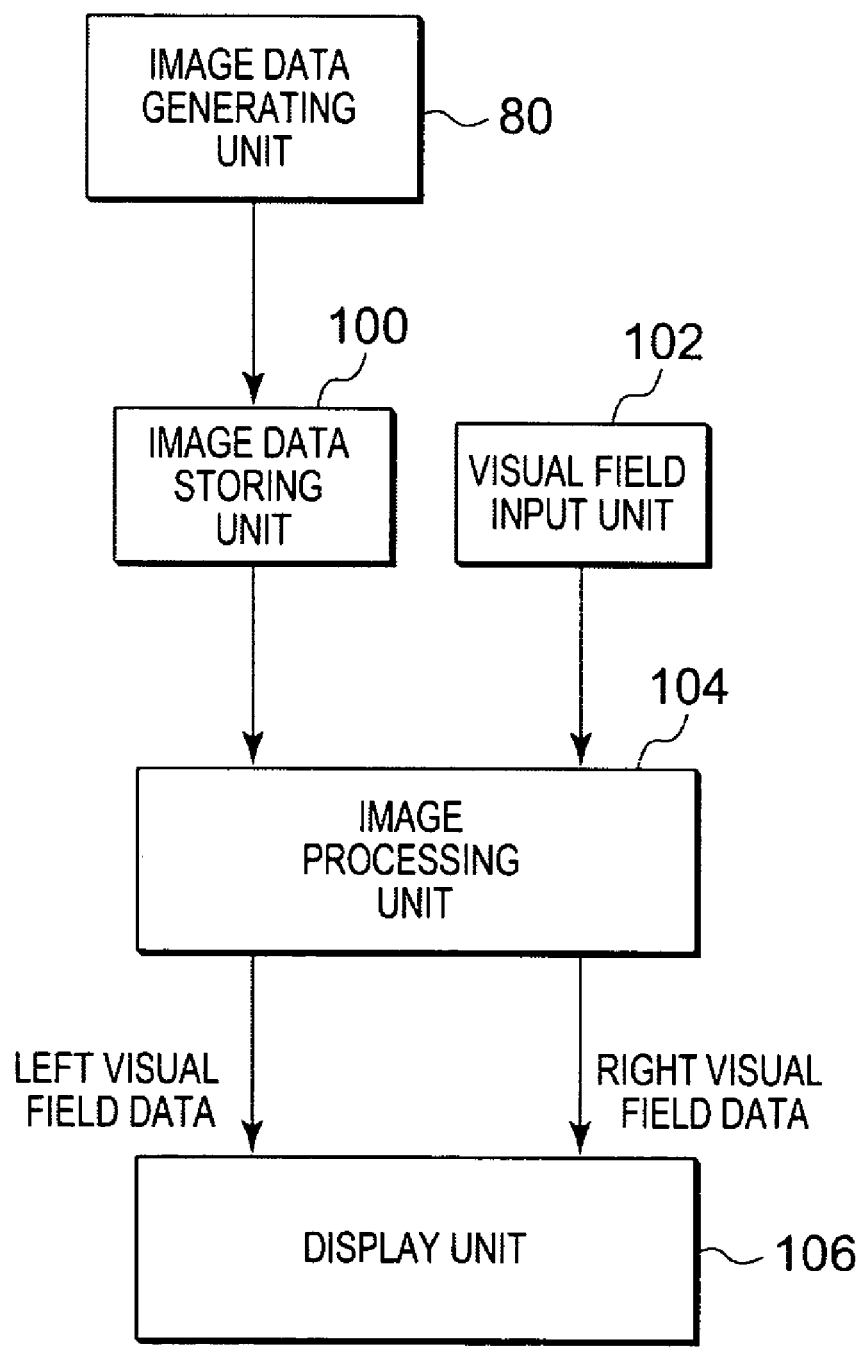
FIG. 2 illustrates another preferred embodiment of the system for simulating stereographic vision according tot the current invention.

Now referring to FIG. 2, another preferred embodiment of the system for simulating stereographic vision according to the current invention includes an image data generating unit 80 for generating image data for stereo vision, an image data storing unit 100 for storing the stereo image data, a visual field input unit 102 for inputting an input signal indicative of a selected visual field, an image processing unit 104 for processing a selected portion of the stereo image data for generating a pair of left visual field data and right visual field data, and a display unit 106 for presenting stereo vision. The visual field input unit 102 includes a keyboard to specify a certain angle or a visual direction detection device which uses an optical sensor for detecting a direction that an observer is facing. The display unit 106 includes a head-mounted display as well as a flat surface display which separately provide an image in a right visual field and a left visual field.

Figure 3:
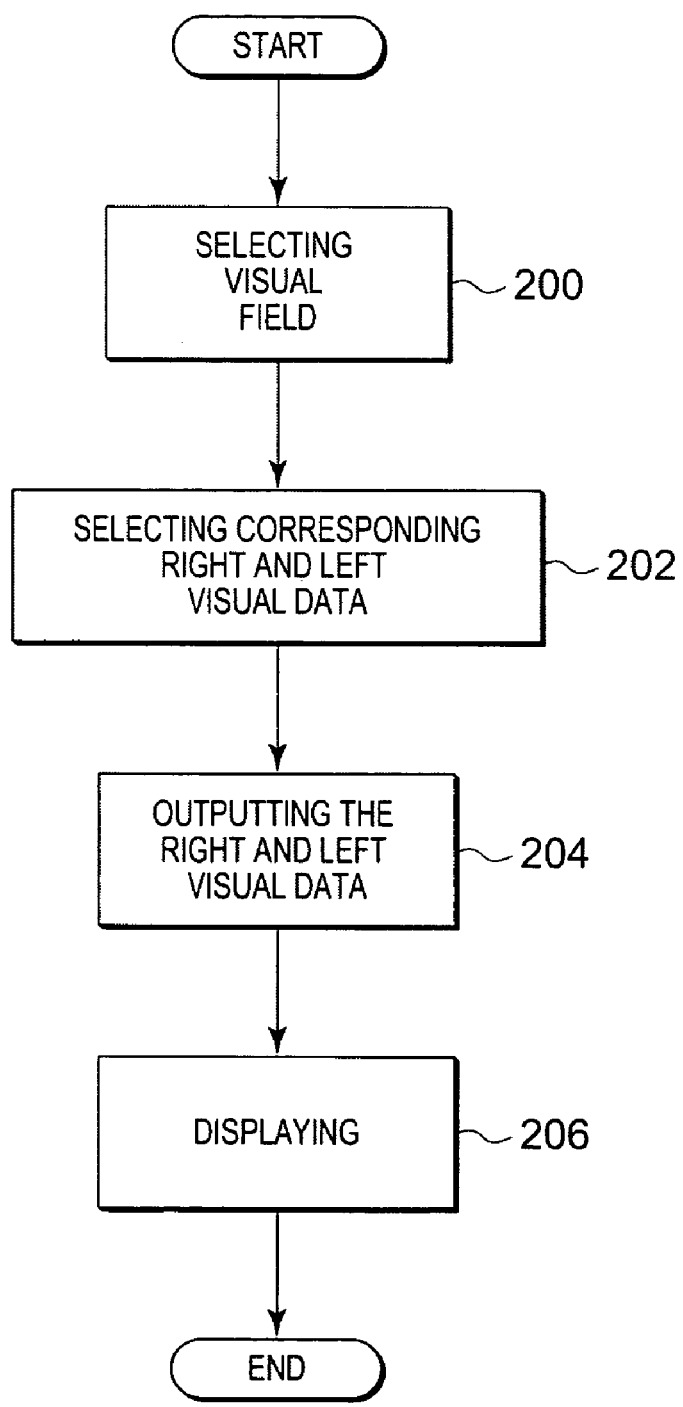
FIG. 3 illustrates steps involved in a preferred process of simulating stereo vision according to the current invention.

FIG. 3 illustrates steps involved in a preferred process of simulating stereo vision according to the current invention. In a step 200, the direction of visual field of an observer is determined within a predetermined wide or panoramic image space. In a step 202, a portion of the image data corresponding to the current visual field is selected. In a step 204, based upon the selected data, a pair of image data corresponding to the selected right and left visual fields is generated and outputted. The above described steps are repeated as the visual directional input changes.

Figure 4:
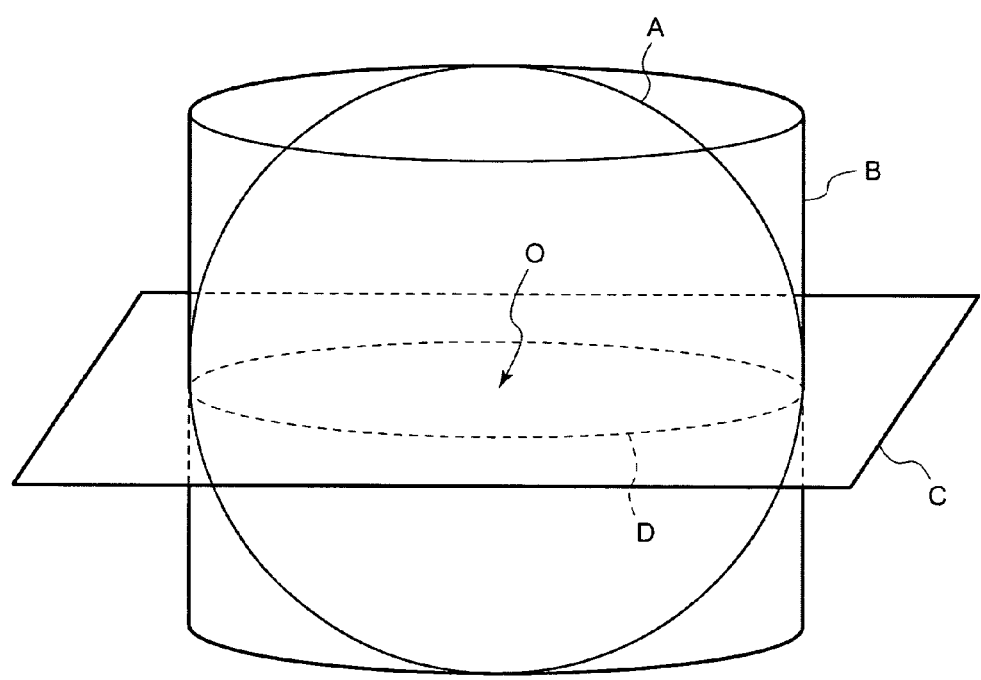
FIG. 4 illustrates that image data is generated from multiple shots taken by a digital camera which is fixed at one point while the camera is rotated along a predetermined plane.

In order to generate stereo vision in a wide viewing angle, for example, image data is generated from multiple shots taken by a digital camera which is fixed at one point while the camera is rotated along a predetermined plane. FIG. 4 illustrates that the camera is fixed at a predetermined location O while the camera is rotated approximately along a plane C for taking images at predetermined angles. These images along and around an equator D may or may not be overlapping with each other depending upon the angles and other factors such as a lens characteristics. When these shots are projected onto inner cylindrical surfaces B, a 360-degree or panoramic view is obtained. As disclosed in Japanese Patent Application Serial Nos. 9-303893 and 9-234095, these adjacent images are composed into a single image having a common angular coordinate system by using a conversion matrix which is generated from relative positions of certain pixels in an overlapping area. By the same token, a panoramic view is obtained in all directions by rotating the camera along multiple planes. The composed image for all directions is projected onto an inner spherical surface or dome A. The following disclosures are taken from a part of Paragraphs [12] through Paragraph [43] of Japanese Patent Application Hei 11-73492 whose serial number is 9-303893 that is incorporated into the current application.

Referring to FIG. 14, in step S1, an integer coordinate pair (i,j) is converted into a real number coordinate pair (ix,jy). That is, (ix=i·x0,jy=j·y0). In a step S2, a plurality of pairs of common patterns is extracted from two images. The pattern extraction is easily implemented by utilizing a block of an appropriate size in one image in another image during a search. The coordinate of a representative point of the extracted common pattern in the image is stored in the corresponding manner. The representative point includes a central pixel or a pixel representing the center of gravity.

A light that enters a lens at an angle θ exits the lens at an angle θ' with respect an optical axis. In a step S3, a measured angle from the optical axis at each pixel on the image is stored. The measured angle is the angle θ', and it is calculated by the following equation where R is a distance between the lens center and the image capturing surface or CCD.

$$\theta' = \arctan(\sqrt{ix^2 + jy^2}/R) \quad (1)$$

The light angle entering the lens is distorted based upon the angle from the optical axis. This is also known as distortion aberration. The following two equations (2) and (3) describe the relations.

$$\theta' = \theta f(\theta) \quad (2)$$

$$f(\theta) = 1 - A\theta^2 + B\theta^4 \quad (3)$$

By inserting the equation (3) into the equation (2), the following equation (4) is available.

$$\theta' = \theta - A\theta^3 + B\theta^5 \quad (4)$$

The equation (3) is a distortion aberration function. If square or fourth power of distortion coefficients A and B is determined, the angle θ' is derived from the angle θ using the equation (2). In step (4), by using the pair of the common pattern between the two images as a key, the distortion coefficients A and B are speculated. Since the speculation is carried out by the steps in the disclosures of Japanese Application Hei 8-273294, the detail description will not be provided here. The summarized procedure is as follows:

The directional angle of the representative point of one common pattern pair is defined by θi', θj'. The directional angle of the representative point of another common pattern pair is defined by θ", θ". Assuming B=0, by incrementing A from the initial A0 by a small predetermined value ΔA, a solution θ is determined by inserting θi', θj', θi" and θj" into the equation (4). The solution is defined by θio', θjo', θio" and θjo". The value of the coefficient A is determined as the error evaluation value converges for the following equation.

$$E = \sum_{i,j} \{(\theta'_{i0} - \theta'_{j0})^2 - (\theta''_{i0} - \theta''_{j0})^2\}^2 \quad (5)$$

Subsequently, by incrementing B from the initial B0 by a small predetermined value ΔB, the direction angle of the common pattern representative point of the pair used for the speculation of A or another pair is inserted into the variable θ' in the equation (4). Using the solution from the equation (4), the conversion of the error evaluation value is investigated in the equation (5). The value B is obtained as the error evaluation value converges.

In step S5, using the distortion coefficients A and B speculated in the step S4, the equation (3) is resolved, and the true angle θ is obtained for the measure angle θ' at each pixel in every image. In a step S6, the θ as obtained from the previous step is converted into the angular coordinate (longitude and latitude).

$$\varphi_x = \arctan\left(\tan(\theta a \cdot \frac{i_x}{\sqrt{i_x^2 + j_y^2}})\right) \quad (6)$$

$$\phi_y = \arctan\left(\tan(\theta) \cdot \cos(\phi_x) \cdot \frac{i_y}{\sqrt{i_x^2 + j_y^2}}\right) \quad (7)$$

The angular coordinates of the equations (6) and (7) are coordinates that are unique to each of the two images. The angular coordinates of the obtained pixel including a representative point of the common patterns are corrected for lens distortion aberration.

Subsequently, a conversion matrix is determined for converting the coordinates of the image into the common angular coordinate system. In the preferred embodiment, the coordinates of a first image are used as a standard, and the angular coordinates of a second image are converted into those of the first image. By referring to FIGS. 3 and 4, the above conversion will be further described.

Figure 15:
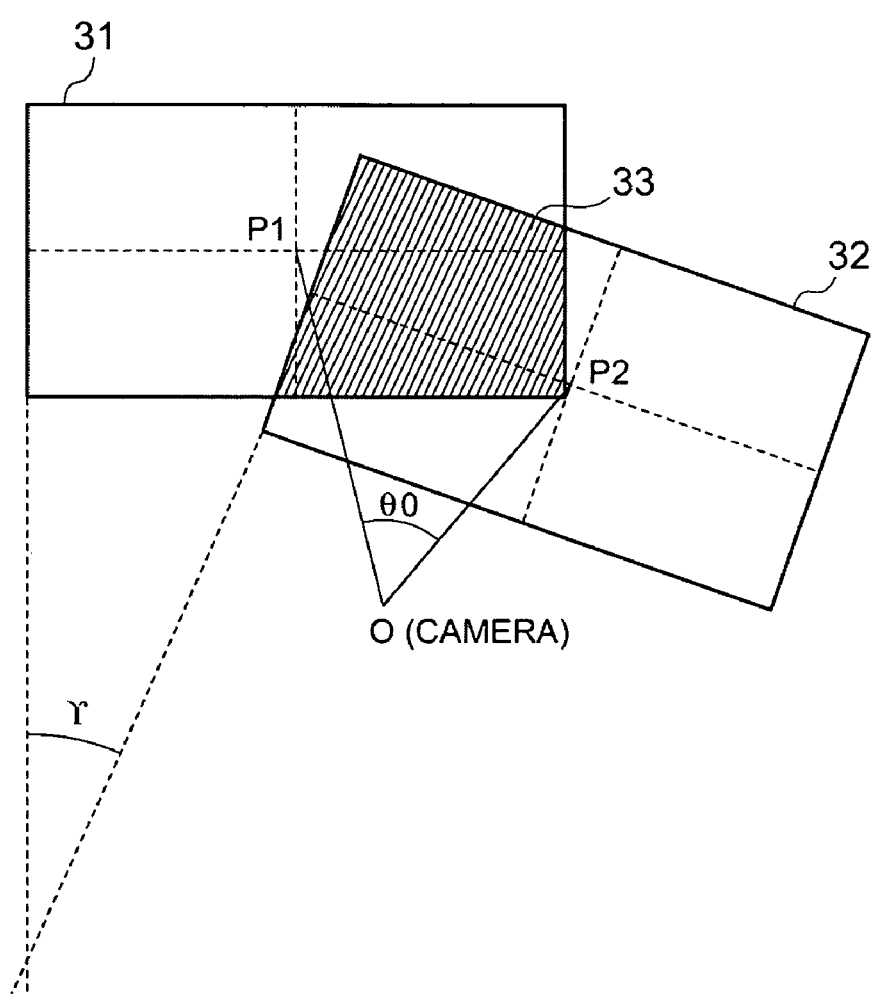
FIG. 15 illustrates two images that are captured at a different angle.

FIG. 15 illustrates two images 31, 32 that are captured at a different angle. The captured image exists at infinity, and the camera lens center O is fixed. An angle θ0 is an angle at the camera between a center P1 of the first image 31 and a center P2 of the second image 32. An angle γ is an amount of tilt between the images 31 and 32. The object on the image is expressed in the angular coordinates including latitude and longitude that are unique to the image. Although the same object is in an overlapping area 33 between the images 31 and 32, in the image 31, the angular coordinates are unique to the image 31 while in the image 32, the angular coordinates are unique to the image 32 despite the common object. In other words, the object common to the images 31 and 32 or the common pattern between the two images has two separate sets of angular coordinates. Since the common pattern is captured from the common object at a common angle, a conversion equation is available for converting the two images into a single coordinate based upon the angular coordinate of the object.

Figure 16:
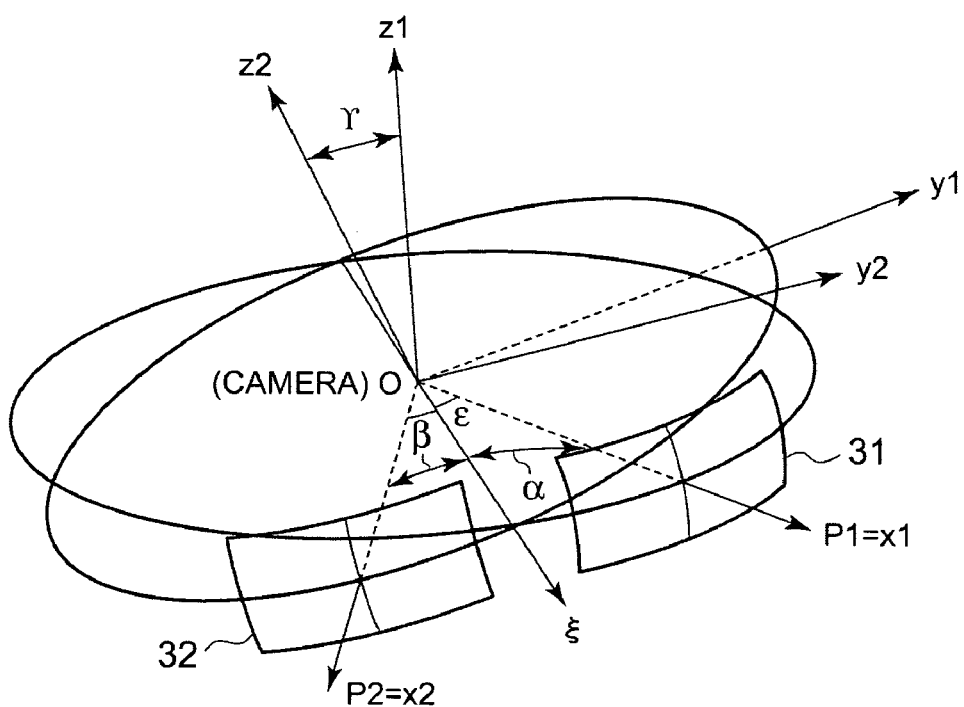
FIG. 16 illustrates that the coordinate system of one image is expressed by (x1, y1, z1) while that of the other image is expressed by (x2, y2, z2).

FIG. 16 is a figure that is redrawn from FIG. 3 in order to describe the coordinate conversion. Although the images 31 and 32 are partially overlapping, the images 31 and 32 are separated in order to avoid complication in FIG. 4.

In FIG. 16, the coordinate system of the image 31 is expressed by (x1, y1, z1) while that of the image 32 is expressed by (x2, y2, z2). Furthermore, a common axis of the (x, y) surface for both of the coordinate systems is expressed by ξ. An angle α is an angle between the common axis x1 and the common axis ξ while an angle γ is an angle between an axis z1 and an axis z2 or an image tilt angle. The coordinate conversion process equation based upon the coordinate (x1, y1, z1) as a standard will be shown below.

$$(x1, y1, z1)^T = \begin{pmatrix} \cos(\alpha)\cos(\beta) - \sin(\alpha)\sin(\delta)\cos(\gamma) & \cos(\alpha)\sin(\beta) + \sin(\alpha)\cos(\beta)\cos(\gamma) - \sin(\alpha)\sin(\gamma) \\ -\sin(\alpha)\cos(\beta) - \cos(\alpha)\sin(\beta)\cos(\gamma) & -\sin(\alpha)\sin(\beta) + \cos(\alpha)\cos(\delta)\cos(\gamma) - \cos(\alpha)\sin(\gamma) \\ -\sin(\beta)\sin(\gamma) & \cos(\beta)\sin(\gamma) & \cos(\gamma) \end{pmatrix} \times (x2, y2, z2)^T \quad (8)$$

A directional cosine of coordinates (x2, y2, z2) is defined to be (l, m, n) while a directional cosine of coordinates (x1, y1, z1) is defined to be (L, M, N). The conversion matrix of the equation (8) is expressed by A. Then, the following equation is available.

$$(L, M, N)^T = A (l, m, n)^T \quad (9)$$

where l=cos ($\phi y$) cos ($\phi x$), m=cos ($\phi y$) sin ($\phi x$), n=sin ($\phi y$), L=cos ($\phi y$) cos ($\phi x$), m=cos ($\phi y$) sin ($\phi x$) and n=sin ($\phi y$). However, ($\phi x$, $\phi y$) and ($\phi x$, $\phi y$) are respectively longitude and latitude. Thus, the equation (9) is now expressed as follows:

$$\begin{pmatrix} \cos(\phi y) & \cos(\phi x) \\ \cos(\phi y) & \sin(\phi x) \\ \sin(\phi y) \end{pmatrix} = A \begin{pmatrix} \cos(\phi y) & \cos(\phi x) \\ \cos(\phi y) & \sin(\phi x) \\ \sin(\phi y) \end{pmatrix} \quad (10)$$

The common pattern of two images 31 and 32 has two angular coordinate systems. However, the common pattern should be expressed by a single angular coordinate. Therefore, by solving the next equation for all pairs (j) of representative points of the common pattern, the values of α, β and γ are determined so that the conversion matrix A is also determined. In a step S7, the conversion matrix A is determined, and in a step S8, using the conversion matrix A, a process is performed so that the angular coordinate of one image is converted into another angular coordinate system of the other image that is used as a standard.

$$\sum_j \left\| \begin{pmatrix} \cos(\phi y) & \cos(\phi x) \\ \cos(\phi y) & \sin(\phi x) \\ \sin(\phi y) \end{pmatrix} - A \begin{pmatrix} \cos(\phi y) & \cos(\phi x) \\ \cos(\phi y) & \sin(\phi x) \\ \sin(\phi y) \end{pmatrix} \right\|^2 \to \min \quad (11)$$

The above allows each pixel on the two images containing the common pattern to be expressed in a single angular coordinate. That is, if the pixels of the two images after the coordinate conversion are plotted in the same memory space, the two images are faithfully composed. However, at this stage, since only the coordinate of each pixel is taken care of and the pixel value is not determined, the composed image cannot be yet displayed.

In order to display a composite image, it is necessary to project pixels with a corresponding pixel value onto a display surface. In a step S9, the process is performed to project the valued pixels. A usual display surface of a display device is a flat surface. To project onto a flat surface, assuming the perpendicular coordinates on the surface to be (u, v) and the angular coordinate to be ($\phi x$, $\phi y$), the perpendicular coordinate (u, v) is derived by u=tan ($\phi x$/R) and v=tan ($\phi y$/R).

A regular display unit has a constant pixel pitch. However, the pixels of the image obtained in the step S9 generally do not have an equal distance. In a step S10, the image from the step S9 is converted into an image having a constant sampling pitch according to the display device. The conversion is accomplished by liner interpolation. In the case of a flat display surface, if the pixel pitch is assumed to be px and py, the pixel value at the coordinate (u, v) is made to be the pixel value at the coordinate (u/px, v/py). The pixel value between the above pixels is determined by liner interpolation based upon the surrounding pixel values.

Up to now, the coordinate conversion and composition of two images have been discussed. By repeatedly converting images near the two coordinate converted images in a similar manner, it is clear that many other images are also composed at a precision level in the single coordinate.

Figure 5:
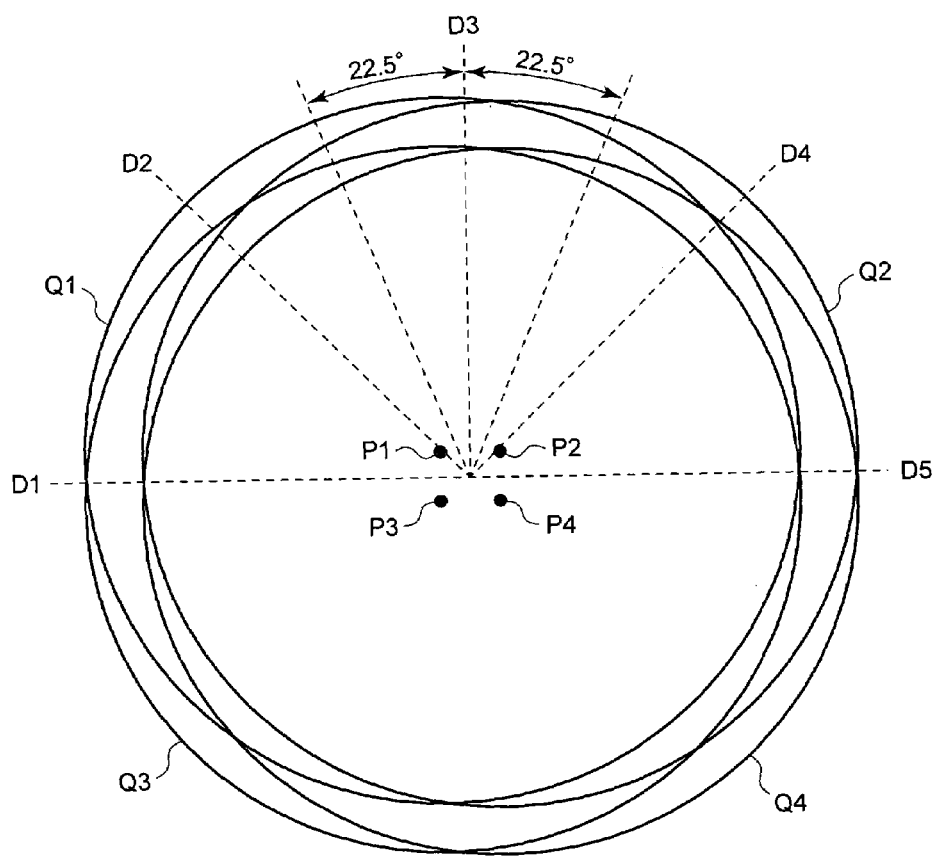
FIG. 5 illustrates a top view of one preferred embodiment of the current invention which includes a plurality of image data sets each representing 360 degrees of view.

Now referring to FIG. 5, to simulate stereo vision, a pair of the above described images has to be independently provided for the right and left visual field. In other words, an observer has to simultaneously see a slightly different image in the right visual field and the left visual field in order to experience stereopsis. A top view of one preferred embodiment of the current invention in FIG. 5 illustrates a plurality of image data sets each representing 360 degrees of view. In this example, images are taken for four 360-degree cylindrical views Q1, Q2, Q3 and Q4, and each of the 360-degree views Q1, Q2, Q3 and Q4 is correspondingly generated around centers P1, P2, P3 and P4. These locations P1, P2, P3 and P4 are typically from 10 centimeters to 50 centimeters apart from each other. The range of the distance generally covers a distance between right and left human eyes, which is an interocular distance. Since the above distance is relatively short, the images taken at the two adjacent locations are substantially similar. By the same token, a panoramic view is obtained in all directions by rotating the camera along multiple planes at each of the multiple locations. The composed image for all directions is projected onto an inner spherical surface or dome.

Still referring to FIG. 5, among the above described four image data sets, a pair of image data sets is selected for the right visual field as well as the left visual field based upon an observer's visual direction. For example, if a subject is looking in a general direction indicated by a dotted line D3 and his or her visual field includes area within 22.5 degrees from the center directional line D3, a portion of the image data set Q1 which is taken about the center P1 is selected for the left visual field while a portion of the image data set Q2 which is taken about the center P2 is selected for the right visual field. By the same token, if the subject is looking in a general direction indicated by a dotted line D4 and his or her visual field includes area within 22.5 degrees from the center directional line D4, a portion of the image data set Q1 which is taken about the center P1 is selected for the left visual field while a portion of the image data set Q4 which is taken about the center P4 is selected for the right visual field. In the above visual directional change from D3 to D4, the left visual field includes an image from the same image data set Q1 while the right visual field includes an image from another image data set. Despite this transition, since the image data sets Q1 and Q4 are generated from images taken at closely located positions, the image shift associated with the transition is generally unnoticed.

In summary, as described above, the independent images in the right and left visual fields cause an observer to perceive stereo vision. Furthermore, as the observer changes the direction in his or her gaze, since the corresponding image data set is continuously selected for the right and left visual fields, the observer of the image experiences stereopsis without undesirable or unnatural visual effects. During visual field changes, according to one preferred embodiment of the current invention, instead of changing from one image data set to another distant image data set, a new image data set is generated based upon a current image data set and a destination image data set on the fly. The new image data set is a combination or an average of the two image data sets. For example, as the visual direction changes from D3 to D4 in FIG. 5, an overlapping portions of the image data sets Q3 and Q4 are superimposed or averaged. Such an additional processing enables an even more natural transition than the image transition without the additional processing.

Figure 6:
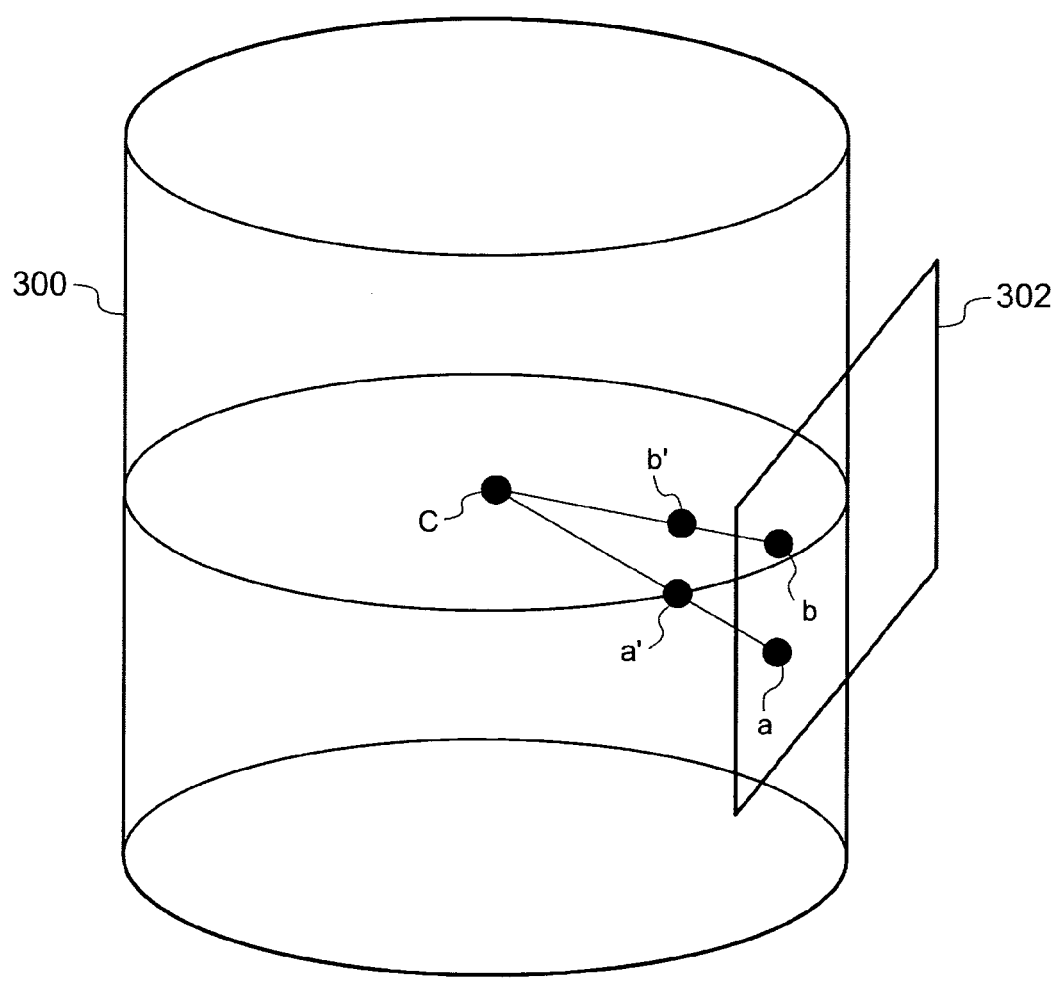
FIG. 6 illustrates that after images are taken onto a flat surface, the images are projected onto a cylindrical surface.

Now referring to FIG. 6, after images are taken onto a flat surface 302, the images are projected onto a cylindrical surface 300. The image data on the cylindrical surface 300 is stored according to the location in a rectangular or square area formed by the opened and flattened inner cylindrical surface. Due to the projection, points b and a on the flat surface 302 are now points b' and a' with respect to the cylindrical surface 300 and a central point c. The selected portion of the stored data, however, is usually projected back onto a flat display surface.

Figure 7:
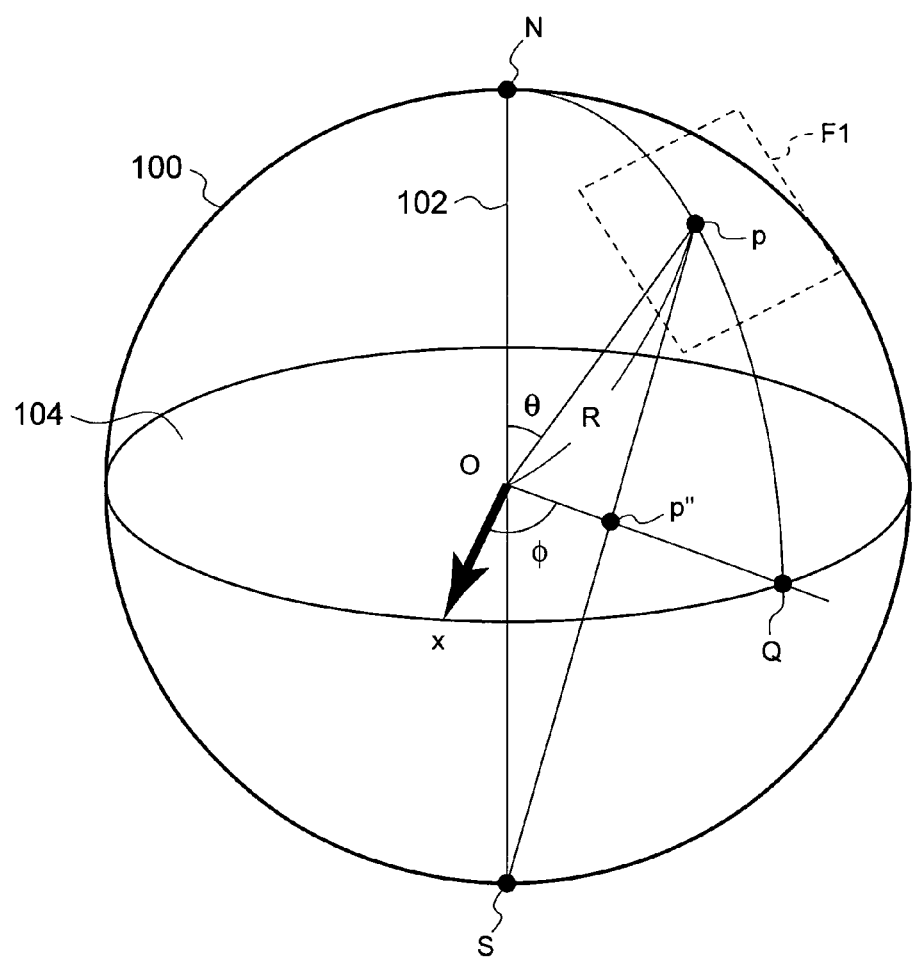
FIG. 7 illustrates one preferred embodiment according to the current invention for storing image data which simulates 3-D perception in all directions.

Now referring to FIG. 7, according to the current invention, one preferred embodiment for storing image data which simulates 3-D perception in all directions is illustrated. In other words, the 3-D images are available on all parts of the inner spherical surfaces. Images are taken by a camera whose lens center coincides at a central location O, and these images on a flat surface such as a portion F1 are projected onto a corresponding portion of a sphere 100 having a radius R to form a whole image. A point N is a north pole reference point while a point S is a south pole reference point. A polar line 102 connects the north pole N and the south pole S and perpendicularly goes through the center O with respect to an equator plane 104. A line Ox is a reference line on the equator plane 104 for indicating an angle $\phi$ between the reference line Ox and a line OQ on the equator plane. In other words, the line OQ indicates an angular location of a point P of an image on the surface F1 with respect to the reference line Ox. An angle $\theta$ is an angle between the polar line 102 and a line Op for indicating an angular location of the point p of the image on the surface F1. If the angle $\theta$ is 90 degrees, the point is on an edge of the equator plane 104. A plurality of the above spherical image data is of course organized for the right and left visual fields as described with respect to FIG. 5.

Figure 8:
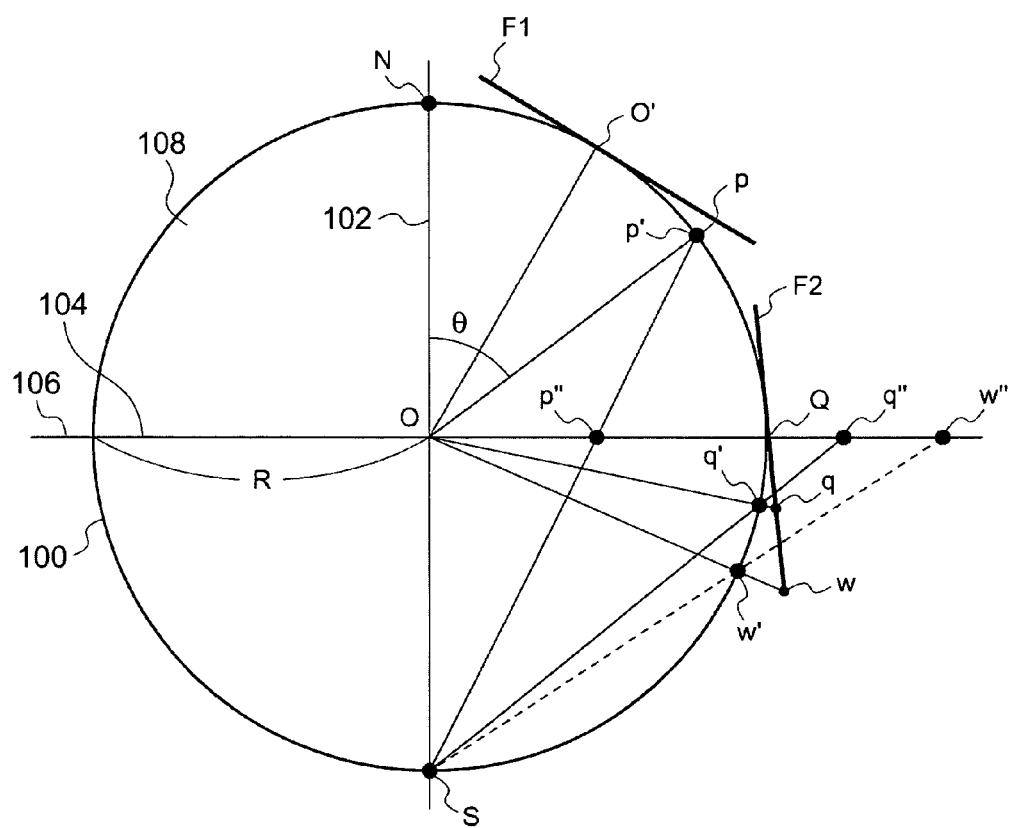
FIG. 8 illustrates a cross sectional view for describing the projection of an image onto a single plane so as to generate a simpler reference scheme on the two dimensional plane.

Now referring to FIG. 8, a vertical cross sectional plane 108 of the sphere 100 includes the north pole N, the south pole S, the center point O as well as a point Q on the equator. A parallel projection plane 106 includes the equator plane 104 and extends beyond the sphere 100. A point O' is a center of the flat surface F1, and a point p is a point on the surface F1. The point p is projected about the center O onto the sphere 100 at a point p'. The point p' is further projected about the south pole S as a center of projection towards the point p' onto the projection plane 106 at a point p". Likewise, all other points in the northern hemisphere of the sphere 100 are ultimately projected onto the projection plane 106 within an equator plane area 104. On the other hand, any points in the southern hemisphere are not ultimately projected inside the equator plane area 104. For example, a point q on a flat surface F2 is projected onto the sphere 100 at a point q' about the center O, and the point q' is ultimately projected about the south pole S via the point q' onto the projection plane 106 at a point q" outside the equator area 104. Similarly, a point w on a flat surface F2 is projected onto the sphere 100 at a point w' about the center O. Since the point w' is located closer to the south pole S than the point q' in the southern hemisphere, the point w' is ultimately projected about the south pole S onto the projection plane 106 at a point w" further outside the equator area 104. The above described projection onto a single plane 106 generates a simpler reference scheme on the two dimensional plane 106 so that individual bit data of the image on the sphere is stored at a corresponding projected location in a single data file.

Figure 9:
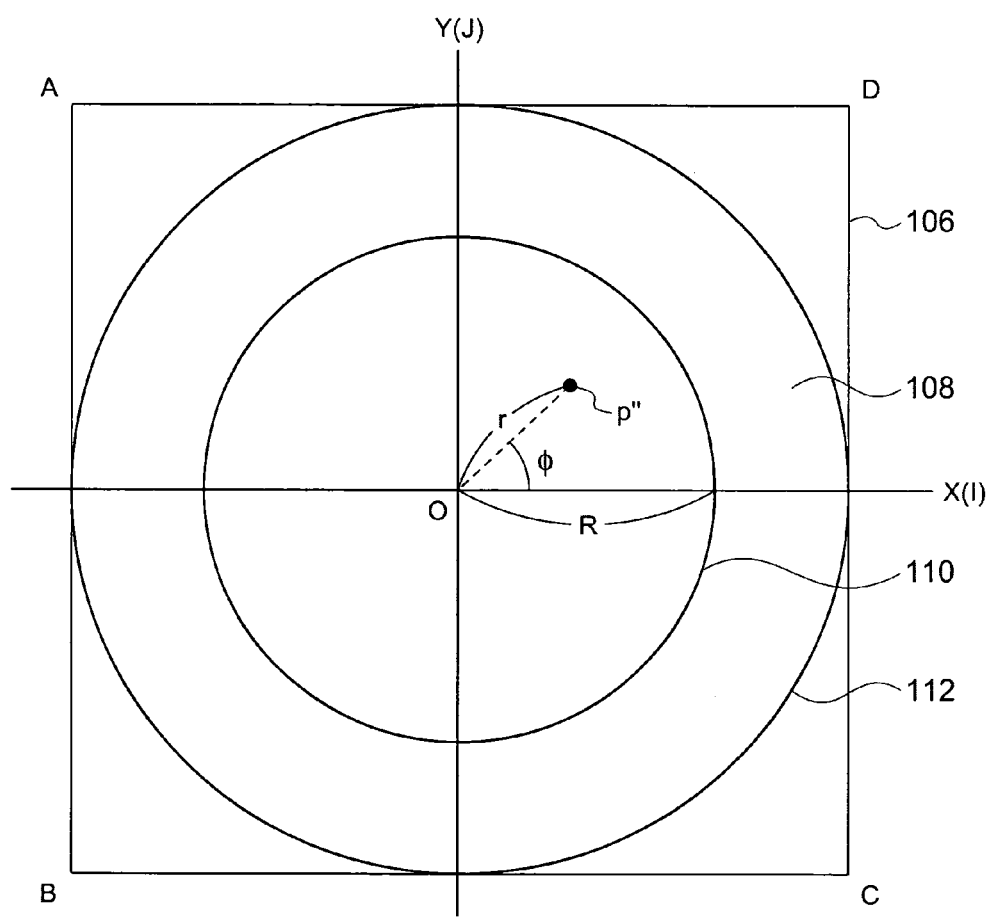
FIG. 9 illustrates the single projection plane of FIG. 8.

To further illustrate the above data storage scheme, now referring to FIG. 9, a smaller circular area 110 corresponds to the equator area 104 with a diameter R from the center O on the projection plane 106 while an area between a larger circle 112 and the smaller circular area 110 is an outside area 108. The inside area 110 includes projection points from the northern hemisphere such as the point p". In contrast, the outside area 108 includes projection points from the southern hemisphere. For example, within the inside area 110, the point p" is located at a distance r from the center O at an angle $\phi$ with respect to the reference axis Ox. The OY axis is perpendicular to the OX axis, and the origin coincides the center of the circular areas 110 and 112.

Figure 10:
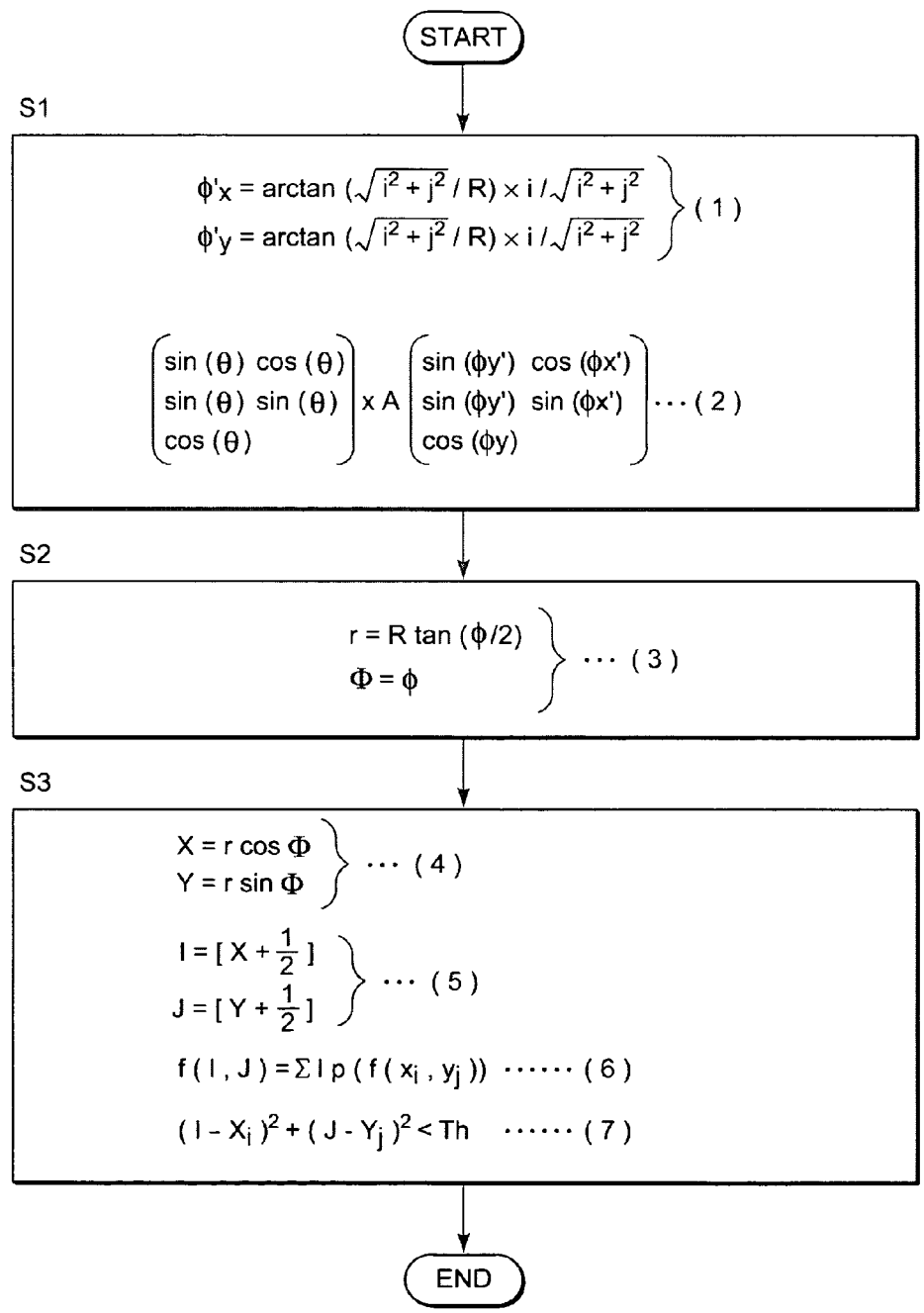
FIG. 10 illustrates steps involved in a preferred process of storing the spherical image data according to the current invention.

Now referring to FIG. 10, steps involved in a preferred process of storing the spherical image data according to the current invention are illustrated in a flow chart. Prior to a step 1, an image is taken by a digital camera, and the image is placed on a coordinate system whose origin is generally on the optical axis of the digital camera. In the step 1, location coordinates (i, j) are temporarily converted into a first pair of temporary angular coordinates ($\phi x'$, $\phi y'$) based upon a first conversion equation (1). R is a radius of a sphere 100 as shown in FIG. 8 or a distance between the lens of the digital camera and the image in the equation (1). Also in step 1, the temporary angular coordinates are now converted into a second pair of standard angular coordinates ($\phi$, $\theta$) based upon a second conversion equation (2). The standard angular coordinates ($\phi$, $\theta$) correspond to the angles $\phi$, $\theta$ as described with respect to FIG. 7. A notation "A" is a coordinate conversion matrix in the second conversion equation (2). The coordinate conversion matrix A converts coordinates between two coordinate systems and is derived from relative positions of corresponding pixels in overlapping adjacent image areas as described in detail in Japanese Patent Application Serial Number 9-166737. For this reason, in order to obtain the conversion matrix A, a series of the images are taken in such a way that the adjacent images partially overlap with each other.

Still referring to FIG. 10, steps 2 and 3 prepare and store the image data and associated coordinate information in an efficient manner. In a step 2, the composed images on the sphere are projected onto a common projection plane in a manner which has been described above with respect to FIG. 8. The common projection plane 106 includes an equator area 104. The projection is accomplished by a third conversion equation (3) which converts the standard angular coordinates ($\phi$, $\theta$) into a pair of polar coordinates (r, $\Phi$). Next, in a step 3, a fourth set of conversion equations (4) converts the polar coordinates (r, $\Phi$) into a perpendicular coordinates (X, Y). The values (X, Y) are further limited to a pair of integer coordinates (I, J) based upon a fifth equation (5). A pair of brackets in the equation (5) indicates that a maximal integer value does not exceed the value in the brackets. Lastly, a memory location as specified by the integer coordinates (I, J) stores an intensity value f which is determined by an exemplary equation (6). $f(x_i, y_j)$ in the equation (6) is a pixel value or an intensity value which is calculated at real number coordinates $(X_i, Y_j)$. Ip ( ) is an interpolation function such as a linear interpolation function and a cubic interpolation function. The above interpolation is performed within a predetermined distance from a given integer coordinates (I, J). For example, the interpolation is performed within a range indicated by an equation (7) where Th is a constant. As a result of the operations performed by the above described steps, image data representative of the composed spherical image is singularly stored and maintained in a common data file.

The integer pairs (I, J) as reference or index to an address where a pixel value or an intensity value is stored are used to manage the image data base in an efficient and desirable way. The index pair (I, J) generally has a range of values such as A<I<B and C<J<D, where A, B, C and D are predetermined constants. In one preferred embodiment of the current invention, the index pairs (I, J) and (I, J+1) referred to contiguous address locations, and at those contiguous locations, pixel values and or intensity values of the contiguous pixels in the sphere are also stored. In another preferred embodiment, a physical distance between pixels whose pixel value and or intensity values are stored at memory locations referred by (I, J) and (I, J+1) in a memory storage unit and that between pixels whose corresponding values are stored at memory locations referred by (I, J+1) and (I, J+2) are substantially similar. Because the pixel density on a spherical surface and the memory are substantially identical in order, the density ratio between near the center and the periphery is 1:4. Yet another preferred process of the current invention optionally includes an additional data compression step for compressing the image data according to a prior art compression technique. Furthermore, a particular one image of the image data is selected as a reference, and the difference between the reference image and each of the rest of the image data is compressed before it is stored for even higher efficiency. Based upon the index, the image data is retrieved efficiently, and in order to reproduce an image, the retrieved image data is processed in a reverse manner by projecting onto a sphere and then projecting again onto a flat display surface perpendicular to a viewing angle. Since the image is already composed, a stereoscopic image in an arbitrary viewing angle is readily available in an efficient manner.

Figure 11:
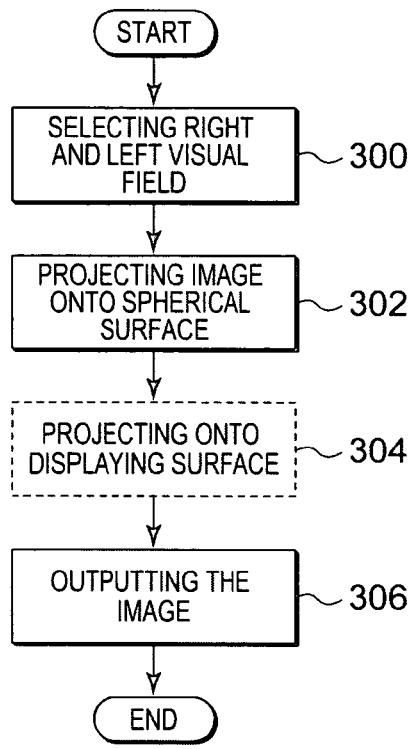
FIG. 11 illustrates steps involved in a preferred process of retrieving and displaying a relevant portion of the stored spherical image data.

Now referring to FIG. 11, a preferred process of simulating stereo vision in a spherical viewing space according to the current invention includes the following steps. In a step 300, a corresponding portion of stored image data for the 3-D spherical viewing space is selected for a right visual field and a left visual field. In a step 302, the selected image data portions are each projected onto a spherical surface. The spherical image is directly outputted in a step 306. Alternatively, the spherical image is optionally projected onto a display surface which is perpendicular to the visual direction in a step 304 before it is outputted in the step 306. The above optional step is specified by an observer.

Figure 12:
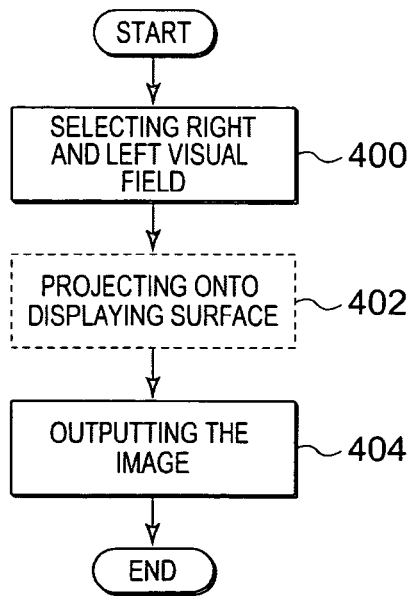
FIG. 12 illustrates steps involved in a preferred process of retrieving and displaying a relevant portion of the stored cylindrical image data.

Similarly, referring to FIG. 12, another preferred process of simulating stereo vision in a cylindrical viewing space according to the current invention includes the following steps. In a step 400, a corresponding portion of stored image data for the 3-D cylindrical viewing space is selected for a right visual field and a left visual field. The cylindrical image is directly outputted in a step 404. Alternatively, in a step 402, the selected image data portions are optionally each projected onto a flat display surface. The above optional step is specified by an observer.

One application of the system of simulating stereoscopic image according to the current invention includes a panoramic view from a top of a mountain or a skyscraper as well as from a helicopter and a hot balloon. Images include both upper and lower views from these viewing points. Since it is not uniform among the applications as to how much lower visual views are necessary or desired, images on the upper hemisphere and the lower hemisphere are separately projected onto the equator plane. The projected image data is stored within a reduced amount of space in a single file for efficient retrieval.

Furthermore, in order to determine a distance between objects, it is desirable to have series of images taken from a common location. According to the current invention, the distance information is derived for objects in a series of images that are taken from separate locations. Although the images are generally projected onto a common plane, if, for example, a perpendicular direction is used as a center of the projection coordinate while a horizontal surface is used as a circumference of the projection coordinate, since the corresponding point of a common object in the series of the images is directly expressed as a difference in angle, the distance information is readily available.

Figure 13:
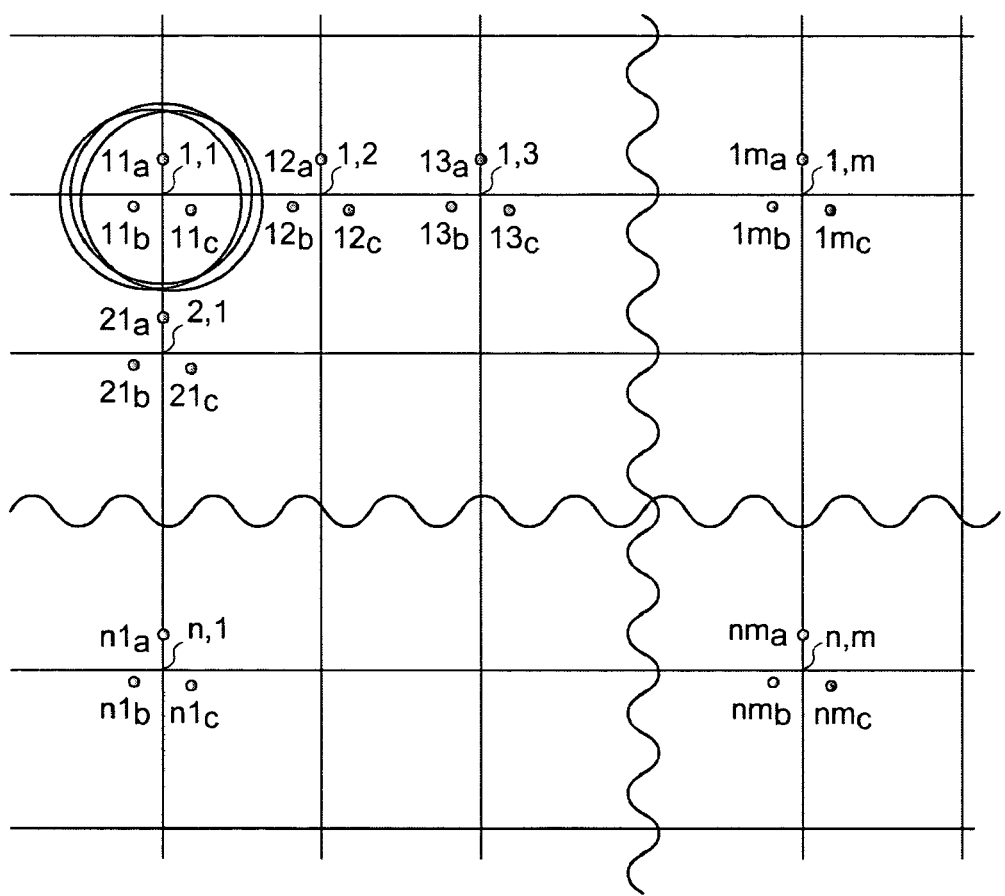
FIG. 13 illustrates another preferred embodiment of the system for simulating stereo vision according to the current invention with a predetermined number of image data sets for simulating 3-D vision in a wide area.

Now referring to FIG. 13, another preferred embodiment of the system for simulating stereo vision according to the current invention includes a predetermined number of image data sets for simulating 3-D vision in a wide area. To illustrate the wide area coverage, a top of view of an area is subdivided into grids, and each corner is designated by a pair of numbers ranging from 1 to n in a vertical direction and from 1 to m in a horizontal direction. At each grid corner, a set of three 360-degree image data sets is prepared. For example, at a grid corner (1,1), the three 360-degree image data sets include a first 360-degree image data set centered at a point 11a, a second 360-degree image data set centered at a point 11b, and a third 360-degree image data set centered at a point 11c. These three points are separated by 120 degrees about the grid (1, 1). By the same token, other grid locations have the similar set of image data.

Still referring to FIG. 13, at each grid location, a stereoscopic vision is simulated based upon corresponding portions from two of the three image data sets. As the visual field changes its angle, a combination of image data set pair is also altered among the same three image data sets. However, in order to for an observer to change his viewing location while experiencing the 3-D vision, that is, he walks to another location in the wide area, the system now switches from one set of the image data sets taken at one location to another set of the image data sets taken at another location. The grid distance and the number of 360-degree image data sets at each grid location both affect the 3-D visual experience.

It is to be understood, however, that even though numerous characteristics and advantages of the present invention have been set forth in the foregoing description, together with details of the structure and function of the invention, the disclosure is illustrative only, and that although changes may be made in detail, especially in matters of shape, size and arrangement of parts, as well as implementation in software, hardware, or a combination of both, the changes are within the principles of the invention to the full extent indicated by the broad general meaning of the terms in which the appended claims are expressed.

What is claimed is:

1. A method of displaying panoramic image data, corresponding first and second portions of the panoramic image data being selected for a right visual field and a left visual field based upon a visual direction of an observer, the selected first and second portions of the panoramic image data being displayed to the right visual field and the left visual field of the observer, the corresponding first and second portions of the panoramic image data being updated based upon a change in the visual direction of the observer, comprising the steps of:
   a) forming a 3D image based upon the panoramic image data captured from at least three predetermined sets of image-capturing locations;
   b) using the same first corresponding portion of the previously displayed panoramic image data without a change for one of the two visual fields in response to the visual directional change; and
   c) changing the second corresponding portion of the panoramic image data for the other of the two visual fields in response to the visual directional change.

2. The method of displaying panoramic image data according to claim 1 wherein said steps b) and c) are repeated as the observer continuously changes the visual direction.

3. The method of displaying panoramic image data according to claim 1 wherein the selected first and second portions of 180 degrees of the panoramic image data is generated for the right visual field and the left visual field.

4. The method of displaying panoramic image data according to claim 1 wherein the selected first and second portions of 360 degrees of the panoramic image data is generated for the right visual field and the left visual field.

5. The method of displaying panoramic image data according to claim 3 wherein the selected first and second portions of the panoramic image data are projected onto inner cylindrical surfaces.

6. The method of displaying panoramic image data according to claim 4 wherein the selected first and second portions of the panoramic image data are projected onto inner spherical surfaces.

7. The method of displaying panoramic image data according to claim 1 wherein the panoramic image data being constructed from non-overlapping images.

8. The method of displaying panoramic image data according to claim 1 wherein the selected first and second portions of the panoramic image data are partially overlapping with each other.

9. The method of displaying panoramic image data according to claim 1 further comprising:
   d) converting positional data of the panoramic image data to angular data;
   e) projecting an upper hemisphere and a lower hemisphere of the selected first and second portions of the panoramic image data onto a corresponding concentric area on a predetermined common flat surface based upon the angular data; and
   f) associating a predetermined characteristic value of the selected first and second portions of the panoramic image data with a position in the concentric area.

10. The method of displaying panoramic image data according to claim 9 wherein the predetermined characteristic value includes an intensity value and a pixel value.

11. The method of displaying panoramic image data according to claim 9 wherein the predetermined characteristic value is stored in a single computer file.

12. The method of displaying panoramic image data according to claim 9 wherein the position is specified by a pair of x-y coordinates about an origin on a center of the concentric area.

13. The method of displaying panoramic image data according to claim 1 wherein a plurality of pairs of the selected first and second portions of the panoramic image data is generated, each of the pairs simulating stereographic vision of the right and left visual field at a predetermined vantage point.

14. A method of displaying panoramic image, corresponding first and second portions of the panoramic image data being selected for a right visual field and a left visual field based upon a visual direction of an observer, the selected first and second portions of the panoramic image data being displayed to a right eye and a left eye of the observer, the corresponding first and second portions of the panoramic image data being updated based upon a change in the visual direction of the observer, comprising the steps of:
   a) forming a 3D image based upon the panoramic image data captured from at least three predetermined sets of image-capturing locations;
   b) using the same first corresponding portion of the previously displayed panoramic image data without a change for one of the two visual fields in response to the visual directional change; and
   c) changing the second corresponding portion of the panoramic image data for the other of the two visual fields in response to the visual directional change, wherein the second updated portion of the panoramic image data being overlapped with the second selected portion of the panoramic image data, the overlapped panoramic image data being displayed to the other of the two visual fields while gradually changed to the second updated portion of the panoramic image data.

15. A panoramic image data displaying apparatus, comprising:
   a memory unit for storing panoramic image data captured from at least three predetermined sets of image-capturing locations;
   a visual direction input unit for inputting a visual direction of an observer;
   an image processing unit connected to said memory unit and said visual direction input unit for selecting the panoramic image data for a right eye and a left eye of the observer based upon the visual direction and generating corresponding first and second portions of the panoramic image data for a right visual field and a left visual field; and
   a display unit connected to said image processing unit for displaying the selected first and second portions of the panoramic image data to the right eye and the left eye of the observer, wherein said image processing unit updating the corresponding first and second portions of the panoramic image data in response to a change in the visual direction of the observer, the same first corresponding portion of the previously displayed panoramic image data being used without a change for one of the two visual fields in response to the visual directional change while the second corresponding portion of the panoramic image data being changed for the other of the two visual fields in response to the visual directional change.

16. The panoramic image data displaying apparatus according to claim 15 wherein said image processing unit repeatedly generates the corresponding first and second portions of the panoramic image data for the right visual field and the left visual field as the observer continuously changes the visual direction.

17. The panoramic image data displaying apparatus according to claim 15 wherein said image processing unit generates the corresponding first and second portions of the panoramic image data for approximately 180 degrees of the right visual field and the left visual field.

18. The panoramic image data displaying apparatus according to claim 15 wherein said image processing unit generates the corresponding first and second portions of the panoramic image data for approximately 360 degrees of the right visual field and the left visual field.

19. The panoramic image data displaying apparatus according to claim 15 wherein said display unit projects an image onto inner cylindrical surfaces.

20. The panoramic image data displaying apparatus according to claim 15 wherein said display unit projects an image onto inner spherical surfaces.

21. The panoramic image data displaying apparatus according to claim 15 wherein said image processing unit repeatedly generates the corresponding first and second portions of the panoramic image data for the right visual field and the left visual field, the panoramic image data being constructed from non-overlapping images.

22. The panoramic image data displaying apparatus according to claim 15 wherein said image processing unit repeatedly generates the corresponding first and second portions of the panoramic image data for the right visual field and the left visual field, the panoramic image data being constructed from at least partially overlapping images.

23. The panoramic image data displaying apparatus according to claim 15 wherein said memory unit further comprises:
 a conversion unit for converting positional data of the corresponding first and second portions of the panoramic image data to angular data, said conversion unit projecting an upper hemisphere and a lower hemisphere of the corresponding first and second portions of the panoramic image data onto a corresponding concentric area on a predetermined common flat surface based upon the angular data; and
 an association unit for associating a predetermined characteristic value of the corresponding first and second portions of the panoramic image data with a position in the concentric area.

24. The panoramic image data displaying apparatus according to claim 23 wherein the predetermined characteristic value includes an intensity value and a pixel value.

25. The panoramic image data displaying apparatus according to claim 23 wherein said memory unit stores said predetermined characteristic value in a single computer file.

26. The panoramic image data displaying apparatus according to claim 23 wherein said conversion unit specifies said position by a pair of x-y coordinates about an origin on a center of the concentric area.

27. The panoramic image data displaying apparatus according to claim 15 wherein said image processing unit generates a plurality of the corresponding first and second portions of the panoramic image data, each of the pairs simulating stereographic vision of at a predetermined vantage point.

* * * * *